US011518667B2

(12) United States Patent
Krüger et al.

(10) Patent No.: US 11,518,667 B2
(45) Date of Patent: Dec. 6, 2022

(54) CARTRIDGE RECEIVER, CARTRIDGE SYSTEM, DRINK PREPARATION MACHINE AND METHOD FOR PRODUCING A DRINK

(71) Applicant: Freezio AG, Amriswil (CH)

(72) Inventors: Marc Krüger, Bergisch Gladbach (DE); Günter Empl, Bergisch Gladbach (DE); Daniel Fischer, Romanshorn (CH)

(73) Assignee: Freezio AG, Amriswil (CH)

( * ) Notice: Subject to any disclaimer, the term of this patent is extended or adjusted under 35 U.S.C. 154(b) by 542 days.

(21) Appl. No.: 16/069,752

(22) PCT Filed: Jan. 12, 2017

(86) PCT No.: PCT/EP2017/050565
§ 371 (c)(1),
(2) Date: Jul. 12, 2018

(87) PCT Pub. No.: WO2017/121800
PCT Pub. Date: Jul. 20, 2017

(65) Prior Publication Data
US 2019/0127200 A1    May 2, 2019

(30) Foreign Application Priority Data

Jan. 12, 2016   (DE) .......................... 102016200254.6
Jul. 1, 2016    (DE) .......................... 102016212012.3
(Continued)

(51) Int. Cl.
*B67D 1/00*     (2006.01)
*B67D 7/02*     (2010.01)
(Continued)

(52) U.S. Cl.
CPC .............. *B67D 1/0079* (2013.01); *A23L 2/54* (2013.01); *A47J 31/0673* (2013.01);
(Continued)

(58) Field of Classification Search
CPC .. B67D 1/0078; B67D 7/0233; B67D 1/0022; B67D 1/045; B67D 1/04; B67D 7/0227;
(Continued)

(56) References Cited

U.S. PATENT DOCUMENTS 3,904,083 A     9/1975  Little
4,314,768 A  *  2/1982  Goglio ............... B65D 75/5877
                                                    222/105
(Continued)

FOREIGN PATENT DOCUMENTS

CA        2556421 C      9/2005
DE        29825074 U1    9/2004
(Continued)

OTHER PUBLICATIONS

International Search Report for International Application PCT/EP2017/050565, dated Apr. 18, 2017.
(Continued)

*Primary Examiner* — Eric S Stapleton
(74) *Attorney, Agent, or Firm* — The Dobrusin Law Firm, P.C.

(57) ABSTRACT

The invention relates to a cartridge receiver (10) for producing a drink (70) using a cartridge (2) that comprises a reservoir (6) filled with a drink substance (7), it being possible to insert the cartridge receiver (10) into a drink preparation machine (3) and connect it to the cartridge (2), wherein the cartridge receiver (10) comprises a mixing chamber (8) that can be brought into fluidic connection with the reservoir (6), and a fluid supply (12) that opens into the mixing chamber (8). The invention is characterised in that
(Continued)

the cartridge receiver (10) comprises a mandrel guide (80) and a puncturing mandrel (73) that is displaceably mounted within said mandrel guide (80), wherein the puncturing mandrel (73) can be displaced between a retracted position in which said puncturing mandrel (73) is positioned at a distance from a sealing element (18) of the cartridge (2), and an extended position in which said puncturing mandrel (73) pierces the sealing element (18) and projects into the reservoir (6). The outer wall of the puncturing mandrel (73) comprises at least one lateral channel (71) for conducting the drink substance (7) in the direction of the mixing chamber (8) when the sealing element (18) has been pierced.

30 Claims, 4 Drawing Sheets (30) Foreign Application Priority Data

| | | |
|---|---|---|
| Jul. 1, 2016 | (DE) | 102016212013.1 |
| Sep. 27, 2016 | (DE) | 102016218507.1 |
| Sep. 27, 2016 | (DE) | 102016218509.8 |
| Sep. 29, 2016 | (DE) | 102016218884.4 |

(51) Int. Cl.

| | |
|---|---|
| *B67D 1/04* | (2006.01) |
| *A47J 31/40* | (2006.01) |
| *A47J 31/06* | (2006.01) |
| *A47J 31/36* | (2006.01) |
| *B65D 51/22* | (2006.01) |
| *B65D 85/804* | (2006.01) |
| *A23L 2/54* | (2006.01) |
| *A47J 31/44* | (2006.01) |
| *B67D 1/08* | (2006.01) |
| *B65D 51/28* | (2006.01) |

(52) U.S. Cl.
CPC ......... *A47J 31/3628* (2013.01); *A47J 31/407* (2013.01); *A47J 31/4425* (2013.01); *A47J 31/4492* (2013.01); *B65D 51/223* (2013.01); *B65D 51/226* (2013.01); *B65D 85/8043* (2013.01); *B65D 85/8055* (2020.05); *B67D 1/0022* (2013.01); *B67D 1/0046* (2013.01); *B67D 1/0078* (2013.01); *B67D 1/04* (2013.01); *B67D 1/045* (2013.01); *B67D 7/0227* (2013.01); *B67D 7/0233* (2013.01); *A23V 2002/00* (2013.01); *A47J 31/3695* (2013.01); *B65D 51/2835* (2013.01); *B67D 2001/0811* (2013.01); *B67D 2001/0812* (2013.01)

(58) Field of Classification Search
CPC ............... B67D 1/0046; B67D 1/0079; B67D 2001/0811; B67D 2001/0812; A47J 31/4492; A47J 31/407; A47J 31/4425; A47J 31/3628; A47J 31/0673; A47J 31/3695; A23L 2/54; A23L 2/52; A23L 2/39; B65D 85/8043; B65D 51/223; B65D 85/8055; B65D 51/226; B65D 51/2835; A23V 2002/00
USPC ......................................................... 99/295
See application file for complete search history.

(56) References Cited

U.S. PATENT DOCUMENTS

| | | | |
|---|---|---|---|
| 4,323,171 A * | 4/1982 | Whorton, III | B67D 1/0079 |
| | | | 222/180 |
| 4,376,496 A * | 3/1983 | Sedam | B67D 1/0021 |
| | | | 222/541.2 |
| 4,581,239 A * | 4/1986 | Woolman | A47J 31/002 |
| | | | 426/433 |
| 4,708,266 A | 11/1987 | Rudick | |
| 4,829,889 A * | 5/1989 | Takeuchi | A47J 31/3633 |
| | | | 99/289 P |
| 4,938,387 A | 7/1990 | Kervefors et al. | |
| 5,097,989 A | 3/1992 | Nakayama et al. | |
| 5,301,838 A | 4/1994 | Schmidt et al. | |
| 5,435,462 A | 7/1995 | Fujii | |
| 5,494,194 A | 2/1996 | Topper et al. | |
| 5,836,482 A * | 11/1998 | Ophardt | A47K 5/1202 |
| | | | 222/325 |
| 5,876,995 A * | 3/1999 | Bryan | A23K 50/80 |
| | | | 435/189 |
| 5,897,899 A * | 4/1999 | Fond | A47J 31/0678 |
| | | | 426/112 |
| 6,789,707 B2 | 9/2004 | Wright | |
| 6,971,549 B2 * | 12/2005 | Leifheit | A47K 3/281 |
| | | | 141/330 |
| 7,597,922 B2 * | 10/2009 | Cheng | A23L 27/00 |
| | | | 426/594 |
| 8,596,498 B2 * | 12/2013 | Werner | B05B 11/3083 |
| | | | 222/136 |
| 2002/0007671 A1 * | 1/2002 | Lavi | A61M 5/19 |
| | | | 73/149 |
| 2002/0078831 A1 * | 6/2002 | Cai | A47J 31/14 |
| | | | 99/295 |
| 2002/0130140 A1 * | 9/2002 | Cote | B67D 3/0019 |
| | | | 222/129.1 |
| 2002/0144603 A1 * | 10/2002 | Taylor | A47J 31/32 |
| | | | 99/295 |
| 2002/0193777 A1 * | 12/2002 | Aneas | A61J 1/2096 |
| | | | 604/411 |
| 2003/0000964 A1 | 1/2003 | Schroeder et al. | |
| 2003/0036725 A1 * | 2/2003 | Lavi | A61M 5/2066 |
| | | | 604/91 |
| 2003/0070554 A1 * | 4/2003 | Cortese | A47J 31/3628 |
| | | | 99/279 |
| 2003/0071058 A1 | 4/2003 | Studer et al. | |
| 2003/0097314 A1 | 5/2003 | Crisp, III et al. | |
| 2004/0055472 A1 | 3/2004 | Stoner | |
| 2004/0188459 A1 * | 9/2004 | Halliday | A47J 31/4492 |
| | | | 222/83 |
| 2005/0077318 A1 * | 4/2005 | Macler | B67D 3/0009 |
| | | | 222/81 |
| 2005/0151764 A1 * | 7/2005 | Grady | G01F 23/2922 |
| | | | 347/7 |
| 2005/0160919 A1 * | 7/2005 | Balkau | A47J 31/0673 |
| | | | 99/279 |
| 2005/0269362 A1 * | 12/2005 | Guerrero | A61L 2/18 |
| | | | 222/148 |
| 2006/0000851 A1 | 1/2006 | Girard et al. | |
| 2006/0047250 A1 * | 3/2006 | Hickingbotham | A61F 9/0017 |
| | | | 604/187 |
| 2006/0138177 A1 | 6/2006 | Wauters et al. | |
| 2006/0174769 A1 * | 8/2006 | Favre | A47J 31/0673 |
| | | | 99/275 |
| 2006/0249536 A1 | 11/2006 | Hartman et al. | |
| 2006/0255066 A1 | 11/2006 | Kannar et al. | |
| 2007/0175334 A1 * | 8/2007 | Halliday | A47J 31/4492 |
| | | | 99/279 |
| 2007/0199453 A1 * | 8/2007 | Rasmussen | B65D 85/816 |
| | | | 99/279 |
| 2008/0029541 A1 | 2/2008 | Wallace et al. | |
| 2008/0302252 A1 * | 12/2008 | O'Brien | A47J 31/005 |
| | | | 99/302 R |
| 2009/0145926 A1 * | 6/2009 | Klopfenstein | B67D 1/0044 |
| | | | 222/129.4 |

(56) References Cited

U.S. PATENT DOCUMENTS

| | | | |
|---|---|---|---|
| 2009/0183640 A1* | 7/2009 | Ozanne | A47J 31/3695 99/295 |
| 2009/0199518 A1* | 8/2009 | Deuber | A47J 31/3628 53/492 |
| 2009/0308488 A1* | 12/2009 | Bennett | B67D 1/0034 141/18 |
| 2010/0049362 A1 | 2/2010 | Hatuka | |
| 2010/0064899 A1* | 3/2010 | Aardenburg | B65D 85/8043 99/295 |
| 2010/0180774 A1* | 7/2010 | Kollep | B65D 85/8043 99/295 |
| 2010/0193544 A1 | 8/2010 | Rusch et al. | |
| 2010/0206177 A1* | 8/2010 | Ricotti | A47J 31/3695 99/295 |
| 2011/0000377 A1* | 1/2011 | Favre | A47J 31/3638 99/289 R |
| 2011/0226343 A1 | 9/2011 | Novak et al. | |
| 2012/0037662 A1 | 2/2012 | Romanyszyn et al. | |
| 2012/0052159 A1 | 3/2012 | Doleac et al. | |
| 2012/0090473 A1* | 4/2012 | Deuber | A47J 31/3695 99/289 R |
| 2012/0121780 A1* | 5/2012 | Lai | A47J 31/605 426/433 |
| 2012/0199011 A1* | 8/2012 | Cheng | A47J 31/3695 99/295 |
| 2012/0199227 A1 | 8/2012 | Manser et al. | |
| 2012/0207893 A1* | 8/2012 | Kruger | A47J 31/3633 426/431 |
| 2012/0231124 A1 | 9/2012 | Kamerbeek et al. | |
| 2013/0055903 A1* | 3/2013 | Deuber | A47J 31/407 99/295 |
| 2013/0061762 A1* | 3/2013 | Carr | A47J 31/3695 99/295 |
| 2013/0062366 A1 | 3/2013 | Tansey | |
| 2013/0084376 A1* | 4/2013 | Fischer | A47J 31/3628 426/425 |
| 2013/0129870 A1* | 5/2013 | Novak | F17C 11/00 426/115 |
| 2013/0224340 A1* | 8/2013 | BenDavid | B65D 85/8043 426/112 |
| 2013/0239820 A1* | 9/2013 | Baldo | A47J 31/407 99/295 |
| 2013/0340626 A1 | 12/2013 | Oh | |
| 2014/0033934 A1* | 2/2014 | Chou | A23N 1/003 99/501 |
| 2014/0130678 A1* | 5/2014 | Frydman | A47J 31/407 99/295 |
| 2014/0245893 A1 | 9/2014 | Vu | |
| 2014/0338542 A1* | 11/2014 | Smith | A47J 31/407 99/295 |
| 2014/0345472 A1 | 11/2014 | Fitz et al. | |
| 2015/0050392 A1 | 2/2015 | Stonehouse et al. | |
| 2015/0216353 A1* | 8/2015 | Polti | A47J 31/5253 426/433 |
| 2015/0374025 A1* | 12/2015 | Evans | B30B 9/20 99/495 |
| 2016/0297664 A1 | 10/2016 | Broodryk | |
| 2017/0135516 A1* | 5/2017 | Fantappie | A47J 31/407 |
| 2019/0016579 A1* | 1/2019 | Kruger | A47J 31/4492 |
| 2019/0127200 A1* | 5/2019 | Kruger | B67D 1/0078 |
| 2019/0241421 A1* | 8/2019 | Kruger | B67D 7/0227 |
| 2019/0248639 A1* | 8/2019 | Kruger | A23L 2/54 |

FOREIGN PATENT DOCUMENTS

| | | |
|---|---|---|
| DE | 102009049945 A1 | 4/2011 |
| DE | 102009052513 A1 | 5/2011 |
| EP | 1671568 A2 | 6/2006 |
| EP | 1806314 A1 | 7/2007 |
| EP | 2000063 A1 | 12/2008 |
| EP | 2017219 A1 | 1/2009 |
| EP | 2017221 A1 | 1/2009 |
| EP | 2080454 A1 | 7/2009 |
| EP | 2268175 B1 | 5/2013 |
| EP | 2923772 A1 | 9/2015 |
| GB | 2020631 A | 11/1979 |
| GB | 2033333 A | 5/1980 |
| GB | 2416757 A | 2/2006 |
| JP | H0279300 U | 6/1990 |
| JP | H10245099 A | 9/1998 |
| JP | 2006-516398 A | 7/2006 |
| JP | 2008-21294 A | 1/2008 |
| JP | 2015-134645 A | 7/2015 |
| RU | 2346882 C2 | 1/2006 |
| RU | 2426687 C2 | 8/2011 |
| WO | 81/00098 | 1/1981 |
| WO | 1996/36556 A1 | 11/1996 |
| WO | 98/05586 A1 | 2/1998 |
| WO | 01/21292 A1 | 3/2001 |
| WO | 2004/067386 A2 | 8/2004 |
| WO | 2004/099060 A2 | 11/2004 |
| WO | 2005/079361 A2 | 9/2005 |
| WO | 2006/005401 A2 | 1/2006 |
| WO | 2007/035820 A2 | 3/2007 |
| WO | 2011/084603 A1 | 7/2011 |
| WO | 2013/036564 A2 | 3/2013 |
| WO | 2014/200481 A1 | 12/2014 |
| WO | 2015/094774 A1 | 6/2015 |

OTHER PUBLICATIONS

Written Opinion for International Application PCT/EP2017/050565, dated Apr. 18, 2017.

Brazilian Office Action dated Mar. 8, 2022, for Brazilian Application No. BR112018014080-5.

* cited by examiner

CARTRIDGE RECEIVER, CARTRIDGE SYSTEM, DRINK PREPARATION MACHINE AND METHOD FOR PRODUCING A DRINK

PRIOR ART

The present invention proceeds from a cartridge system, insertable into a beverage preparation machine, for producing a beverage, in particular a cold beverage, having a cartridge which has a reservoir filled with a beverage substance, and a cartridge receptacle which is reversibly connectable to the cartridge and into which the cartridge is reversibly insertable, and having a cartridge emptying device which effects an at least partial transfer of the beverage substance from the reservoir into a mixing chamber.

Such systems are known in principle from the prior art and are used to produce beverages from pre-portioned cartridges. The production of beverages with such systems is extremely convenient for the user since he merely has to insert a cartridge and press a start button. The beverage preparation machine then undertakes the production thereof in a fully automated manner, i.e., in particular, the beverage substance is blended with a predetermined quantity of liquid, in particular cold and carbonated water, and conveyed into a drinking vessel. In this way, in particular mixed drinks can be produced much more easily, quickly and with less effort for the user. The user can choose from a large number of different cartridges here, and so he can produce different drinks as desired.

A major challenge with such systems is that of reliably and completely preventing back-contamination of the beverage preparation machine during the production of the beverage, since otherwise there is the risk of soiling through to mold formation within the beverage preparation machine. This goes in particular for cartridges which contain beverage substances containing fructose, alcohol or milk.

In systems known from the prior art, the cartridge is usually inserted into a cartridge receptacle that is configured as a fixed constituent of the beverage preparation machine, and the cartridge is then opened on both sides, i.e. on an inlet side and on an outlet side. On the inlet side, water is subsequently introduced into the cartridge by means of a fluid feed, such that the beverage is already formed within the reservoir in the cartridge by the beverage substance being blended with the water. On the outlet side, the beverage leaves the cartridge and is conveyed to a drinking vessel. The water flows through the reservoir fully in the process and thus causes the beverage substance to be conveyed out of the reservoir.

It has been found that, when the water is introduced directly into the reservoir filled with the beverage substance, back-contamination of the feed cannot be completely prevented because the reservoir is usually completely filled with the beverage substance and, as a result, a considerable rise in pressure takes place in the reservoir upon introduction of the water. Both this rise in pressure in the reservoir and the flushing of the reservoir ensure that, during and/or shortly after the beverage production, very small droplets, particles and/or suspended solids of the beverage substance pass into the fluid feed and result in continuous soiling of the beverage preparation machine there.

A further problem is that of closing the cartridge in an airtight and liquid-tight manner after it has been filled with the beverage substance, in order that the aroma of the beverage substance is retained. At the same time, however, it is also necessary to ensure that the cartridge can be opened easily, reliably and completely again in the beverage preparation machine in order for it to be possible to use the beverage substance.

SUMMARY OF THE INVENTION

Therefore, it is an object of the present invention to provide a cartridge receptacle, a cartridge system, a beverage preparation machine, and a method for producing a beverage by inserting the cartridge system into a beverage preparation machine, in which back-contamination of the beverage preparation machine is effectively avoided, and easy and reliable opening of a cartridge, previously closed in an aroma-tight manner, in a beverage preparation machine is allowed.

This object is achieved by a cartridge receptacle as claimed in claim 1.

The cartridge receptacle according to the invention and the cartridge system according to the invention have, compared with the prior art, the advantage that the fluid feed, unlike in the prior art, does not lead into the reservoir of the cartridge but into the mixing chamber that is separate from the reservoir. This effectively prevents back-contamination of the beverage preparation machine from taking place through the fluid feed in a manner that is simple and cost-effective to realize. For this purpose, the reservoir is not flushed by the fluid but, according to the present invention, the beverage substance and the fluid pass into the mixing chamber separately from one another. The fluid is passed directly into the mixing chamber, while the beverage substance is transferred into the mixing chamber by the cartridge emptying device and independently of the fluid. To this end, the cartridge receptacle according to the invention also has the piercing spike mounted in a displaceable manner in the spike guide. In the initial state of the cartridge receptacle, the piercing spike is in a retracted position and can be transferred from the retracted position into the extended position in order to open a sealing element of the cartridge. In the extended position, the sealing element is perforated by the piercing spike such that the beverage substance passes past the sealing element and into the mixing chamber through the at least one lateral channel. Previously, the reservoir is closed in particular in an airtight and liquid-tight manner by means of the sealing element. Thus, easy and reliable opening of a cartridge, previously closed in an aroma-tight manner, in a beverage preparation machine is allowed. It has also been found that back-contamination of the beverage preparation machine is prevented in a much more effective manner compared with the prior art, in particular since no overpressure acting directly on the fluid feed is generated in the reservoir. The configuration of the mixing chamber in the cartridge receptacle, which is reversibly insertable into the beverage preparation machine, advantageously ensures that the mixing chamber is part of the exchangeable cartridge system. In this way, soiling of the beverage preparation machine by the beverage substance is effectively avoided because only parts of the exchangeable disposable or reusable cartridge system come into contact with the beverage substance.

Advantageous configurations and developments of the invention can be gathered from the dependent claims, and from the description with reference to the drawings.

According to one preferred embodiment of the present invention, provision is made for the piercing spike to comprise a cylindrical or frustoconical base part and a piercing part that extends in the direction of the reservoir, wherein the piercing part is configured in the form of an obliquely truncated cone. Preferably, the piercing part is also configured such that an oblique cut face of the obliquely truncated cone substantially faces the reservoir, wherein the oval circumference of the cut face at least partially represents a cutting edge for perforating the sealing element. It has been found that the cut face which is produced by an oblique cut through the truncated cone cuts the sealing element easily and with sufficiently little force, and, moreover, does not cut off any shavings or loose bits from the sealing element, which would otherwise contaminate the beverage in an undesired manner. The sealing-element perforation is advantageously of such a form that the material of the sealing element is cut through with a smooth cut on that side of the piercing spike on which the cutting edge protruding maximally in the direction of the reservoir is formed, while, in the region of the cut face of the piercing part, the cut-off material of the sealing element is still connected to the rest of the sealing element and preferably rolls up or is folded together.

Preferably, the piercing spike comprises an intermediate part arranged between the base part and the piercing part, said intermediate part being configured in a frustoconical manner, wherein a circumferential shoulder is formed between the base part and the intermediate part, and wherein a circumferential edge is formed between the piercing part and the intermediate part. In this way, a stable piercing spike is advantageously formed. The formation of the edge has the advantage that, provided that they extend over the edge, the lateral channels have an enlarged entry on the reservoir side and thus the transfer of the beverage substance in the direction of the mixing chamber is made easier. The shoulder serves to butt against a stop of the spike guide when the piercing spike is in the extended position, such that the extending movement of the piercing spike in the direction of the cartridge is limited.

According to one preferred embodiment of the present invention, provision is made for the cartridge receptacle to have a plurality of lateral channels, wherein each lateral channel extends parallel to the piercing spike in the region of the piercing part and in the region of the intermediate part. The lateral channels are in this case each configured in particular in the form of a groove, open on one side, introduced into the outer face of the piercing spike. Preferably, the lateral channels are formed at least partially in a rear circumferential region, with respect to the cut face, of the piercing spike. This has the advantage that the lateral channels are arranged on that side of the sealing-element perforation on which a cut has been created in the material, and not on the opposite side, on which the cut-off material is still connected to the rest of the sealing element. The beverage substance can thus flow into the lateral channels in a comparatively unimpeded manner.

It is conceivable for the cross section of the lateral channels and/or the number of the lateral channels to be adapted to the viscosity of the beverage substance, such that the lateral channels control or limit the flow of the beverage substance in the direction of the mixing chamber. At a high viscosity, a plurality of lateral channels or lateral channels with a relatively large cross section are used, while, at a lower viscosity, fewer lateral channels or lateral channels with a smaller cross section are provided. Thus, a matching cartridge receptacle exists for each cartridge.

According to one preferred embodiment of the present invention, provision is made for the piercing spike to have a twist prevention means in the form of a rib protruding radially from the base part. Twisting of the piercing spike is thus advantageously avoided while it is being transferred from the retracted position into the extended position. It is also ensured that the lateral channels are arranged on that side of the piercing spike which faces away from the beverage outlet of the mixing chamber and in particular faces the fluid feed. In this way, improved mixing of the beverage substance and the fluid within the mixing chamber is achieved.

According to one preferred embodiment of the present invention, provision is made for the piercing spike to have an integrated compressed-air line, which is the cartridge emptying device, wherein the compressed-air line extends along the piercing spike in particular from a first end of the piercing spike to a second end of the piercing spike. In this way, three functions are advantageously integrated into the piercing spike: 1. The piercing spike comprises the piercing part in order to perforate the sealing element and thus to open the cartridge; 2. The piercing spike comprises the lateral channels in order to allow the beverage substance to be transferred into the mixing chamber; 3. The piercing spike comprises the integrated compressed-air line in order to blow compressed air into the reservoir, with the result that the beverage substance is pushed into the mixing chamber under pressure.

Preferably, a compressed-air connection for connecting to a compressed-air source is formed at the second end, and a compressed-air outlet for blowing compressed air into the reservoir is formed at the first end. The cartridge emptying device integrated into the cartridge receptacle thus comprises, within the meaning of the present invention, first of all only one compressed-air line, through which compressed air can be introduced into the reservoir from the outside. The cartridge receptacle is configured such that the beverage substance is pushed out of the reservoir into the mixing chamber by the compressed air. The compressed air is provided in particular by the beverage preparation machine. It is conceivable for a compressed-air source to be coupled directly to the compressed-air connection as soon as the cartridge system is inserted into the beverage preparation machine. This has the advantage that back-contamination in the direction of the beverage preparation machine is effectively avoided because the cartridge emptying device is immediately under pressure when the cartridge system is inserted and thus beverage substance is prevented from traveling in the direction of the compressed-air line and in particular in the direction of the compressed-air source of the beverage preparation machine. The beverage substance can thus move only in the direction of the mixing chamber from the reservoir.

According to one preferred embodiment of the present invention, provision is made for the compressed-air outlet to be configured as an opening in the cut face. This has the advantage that the air flowing into the reservoir is blown in on a side of the piercing spike that is remote from the lateral channels, such that the discharging of the beverage substance into the mixing chamber is not impeded. Preferably, a swirl thus forms in the reservoir, this favoring virtually residue-free emptying of the reservoir.

The compressed-air connection is configured in particular as an opening in the base part, wherein the base part is arranged in the cartridge receptacle such that the compressed-air connection is accessible from outside the cartridge receptacle. In this way, the connection of the compressed-air line to the compressed-air source is favored.

According to one preferred embodiment of the present invention, provision is made for the spike guide to have a guide part with an internal guide channel for receiving the piercing spike, wherein the guide channel of the guide part is configured in a substantially cylindrical or frustoconical manner, and wherein a circumferential stop is formed at an end of the guide part that faces the cartridge, said stop limiting the movement of the piercing spike in the direction of the reservoir, wherein the stop comprises in particular a region with a reduced diameter. In this way, reliable guiding of the piercing spike during the movement from the retracted position into the extended position is advantageously achieved. Preferably, a groove corresponding to the rib is formed as twist prevention means within the wall of the guide channel, such that undesired twisting of the piercing spike is prevented. The guide part is preferably arranged in the mixing chamber and protrudes from a bottom of the mixing chamber in the direction of the cartridge.

According to one preferred embodiment of the present invention, provision is made for the piercing spike to be configured as a plastic part and in particular as an injection-molded plastic part. This allows cost-effective production. In principle, however, it would alternatively also be conceivable to configure the piercing spike as a metal part.

According to one preferred embodiment of the present invention, provision is made for the piercing spike to be configured such that it is transferable from the retracted position into the extended position by a release element of the beverage preparation machine when the cartridge system is inserted into the beverage preparation machine.

According to one preferred embodiment of the present invention, provision is made for the cartridge to have a cartridge opening fluidically connected to the reservoir, wherein the cartridge opening is closed by the sealing element in the initial state, wherein the sealing element comprises in particular a sealing foil which has been applied to and preferably sealed onto the edge of the cartridge opening. Advantageously, the reservoir is thus closed hermetically and in an aroma-tight manner. The sealing foil is, to this end, configured in particular in a largely airtight and liquid-tight manner. In order to produce this cartridge system, first of all the cartridge is created with the cartridge opening, then the cartridge is filled with the beverage substance through the cartridge opening, subsequently the cartridge opening is closed by the sealing element, and finally the cartridge receptacle is clip-fastened onto the cartridge in the region of the closed cartridge opening. Before, during or after the insertion of the cartridge system into the beverage preparation machine, the sealing element has to be opened in the region of the cartridge opening, for example by perforation of the sealing foil by the piercing spike, in order that the beverage substance can be transferred from the reservoir into the mixing chamber by introduction of the compressed air.

Preferably, provision is made for the mixing chamber to have a beverage outlet through which the beverage formed from a blend of the beverage substance with the fluid is discharged, wherein the cartridge receptacle is preferably configured such that the beverage is able to be introduced directly into a portable vessel from the beverage outlet.

The cartridge receptacle as claimed in one of the preceding claims, wherein the cartridge receptacle is releasably connectable to the cartridge via a latching connection. Preferably, the cartridge receptacle is accordingly fastened reversibly to the cartridge, particularly preferably by the latching connection. It is conceivable for example for the cartridge to comprise a kind of bottleneck (having the cartridge opening) with a circumferential retaining flange and for the cartridge receptacle to be clip-fastened onto the bottleneck. In the process, in particular elastic latching elements, for example retaining arms, engage behind the retaining flange. The cartridge is provided in particular as a single-use container for the beverage substance, being in particular recyclable. Advantageously, the cartridge receptacle can be used multiple times by being able to be fastened to different cartridges. In addition, the production of the cartridge system is simplified since the cartridge and the cartridge receptacle can be produced separately and the cartridge receptacle is subsequently merely clip-fastened onto the cartridge. The cartridge comprises in particular an angular, round or rounded bottle. The cartridge is produced in particular from plastic in an injection blow-molding process or in an injection-molding process or by other molding processes. In principle, however, a thermoforming process would also be conceivable for producing the cartridge. Likewise, it would, of course, also be conceivable for the cartridge to be usable multiple times. In principle, it would also be conceivable for the cartridge to comprise a glass bottle, while only the cartridge receptacle is a plastic part.

According to a further preferred embodiment of the present invention, provision is made for the mixing chamber to have a beverage outlet through which the beverage formed from a blend of the beverage substance with the fluid is discharged, wherein the cartridge system is preferably configured such that the beverage is able to be introduced directly into a portable vessel from the beverage outlet. Advantageously, therefore, neither the beverage substance nor the produced beverage comes into contact with any part of the beverage preparation machine, and so any (back-) contamination of the beverage preparation machine is more or less avoided. The fluid is fed to the mixing chamber separately. Preferably, the fluid is introduced into the mixing chamber under pressure. The fluid is provided in particular by the beverage preparation machine. It is conceivable for a fluid source to be coupled directly to a corresponding fluid connection of the cartridge receptacle as soon as the cartridge system is inserted into the beverage preparation machine. The fluid connection is in this case fluidically connected to the mixing chamber via a fluid line. This has the advantage that back-contamination in the direction of the beverage preparation machine is effectively avoided because the fluid connection is immediately under pressure when the cartridge system is inserted and thus beverage substance is prevented from traveling in the direction of the fluid line and in particular in the direction of the fluid source of the beverage preparation machine. The beverage substance and the beverage can thus move only in the direction of the beverage outlet from the mixing chamber. The fluid comprises in particular water, preferably pressurized, cooled and/or carbonated drinking water.

According to one preferred embodiment of the present invention, provision is made for the mixing chamber to be provided with mixing structures. The mixing structures advantageously ensure improved mixing of beverage substance and fluid. For this purpose, the mixing structures are configured in particular such that the fluid flowing into the mixing chamber is swirled. It is conceivable for the mixing structure to comprise one or more mixing ribs which are arranged in the region of the fluid feed at the bottom of the mixing chamber and extend substantially perpendicular to the direction in which the fluid flows in. The mixing ribs thus act as barriers for the fluid, with the result that the fluid is swirled up and better mixing with the beverage substance is achieved.

According to a further preferred embodiment of the present invention, provision is made for the fluid feed to be supplied with fluid which is cooled by a refrigeration unit, wherein the refrigeration unit is part of the beverage preparation machine or of a separate refrigerator operatively connected to the beverage preparation machine. Advantageously, it is thus possible for cold beverages to be produced even when the cartridge is not cooled and is at room temperature for example. The integration of the system into an existing refrigerator has the advantage that the existing refrigeration unit of the refrigerator can be co-used easily in an efficient manner for the beverage preparation machine. In particular, in what are known as "side-by-side" refrigerators (often also referred to as American refrigerators), sufficient installation space for integrating the system is found in the front. It is conceivable for the beverage preparation machine to be a retrofitting set for such a refrigerator. The refrigeration unit comprises preferably a compressor cooling unit, an absorber cooling unit or a thermoelectric cooler.

According to a further preferred embodiment of the present invention, provision is made for the fluid feed to be supplied with fluid to which carbonic acid is added by a carbonator. It is conceivable for the carbonator to be part of the beverage preparation machine, and wherein the carbonator has a receptacle for a $CO_2$ cartridge and a feeding device for adding $CO_2$ from the $CO_2$ cartridge to the fluid. Advantageously, it is thus also possible to produce carbonated soft drinks with the system. Alternatively, it would also be conceivable for the carbonator to have an external $CO_2$ connection.

According to a preferred further embodiment of the present invention, provision is made for the cartridge to have a further cartridge opening on an opposite side from the cartridge opening, said further cartridge opening being closed by a further sealing element, in particular a further sealing foil. Advantageously, the cartridge can thus also be produced in a favorable injection-molding process.

According to a preferred embodiment of the present invention, provision is made for the cartridge and/or the cartridge receptacle to have a product identifier and for the beverage preparation machine or the cartridge receptacle to have an identifier detector for identifying the product identifier. Preferably, the product identifier is embedded in a barcode, an RFID code, a QR code, a data matrix code, a color code, a hologram code or the like. Advantageously, automated reading of the product identifier is thus possible. The identifier detector comprises in particular an optical sensor, for example a CCD camera, which automatically reads the barcode or QR code or data matrix code when the cartridge has been inserted into the beverage preparation machine. Alternatively, the identifier detector comprises a transceiver antenna for automatically reading the RFID code. Alternatively, it would be conceivable for the product identifier also to be embedded in other automatically readable computer chips. The term QR code includes, within the meaning of the present invention, in particular any data matrix code. In this regard, the terms QR code and data matrix code are used synonymously. Alternatively or additionally, it would also be conceivable for the product identifier to comprise a barcode, a dot code, a binary code, a Morse code, Braille code (embossed printing) or the like. The code can in this case also be embedded in a three-dimensional structure, for example a relief. The product identifier comprises in particular what is known as the product identification number, in particular a Universal Product Code (UPC), a European Article Number (EAN), a GS1 code, a Global Trade Item Number (GTIN) or the like. In this way, it is not necessary for a new code system to be introduced. In particular, the product identifier is covered by the GS1 standard.

The product identifier serves in particular to specify the beverage substance located in the cartridge. During or before the start of the beverage preparation process, the product identifier is read with the identifier detector. Thus, the beverage preparation machine knows which type of cartridge has been introduced into the beverage preparation machine. It is conceivable for an evaluation and control unit of the beverage preparation machine to have a multiplicity of prestored beverage production programs which are provided for the preparation of different beverages and differ from one another for example in terms of the delivery rate, delivery time, delivery pauses, temperature, degree of carbonation and/or pressure of the fluid fed. It is also conceivable for different compressed-air feeds (for example at different pressures) to be used in different beverage production programs. Each beverage production program is linked to one or more product identifiers. When a cartridge is introduced into the beverage preparation machine, the product identifier on the cartridge is read with the identifier detector and then compared with the prestored data. Using the product identifier, a beverage production program is thus selected from the plurality of prestored beverage production programs and subsequently the beverage production process with the selected beverage production program is started. The parameters such as delivery rate, delivery time, delivery pauses, temperature, degree of carbonation and/or pressure of the fluid fed are predetermined or controlled by the selected beverage production program in order to achieve optimal results for the beverage to be produced with the particular beverage substance.

It is conceivable for the beverage production process not to start at all when a product identifier is not identifiable or the identified product identifier does not match any prestored beverage production program. This prevents a system-incompatible cartridge from being used in the beverage production machine, which is not certified for operation in the beverage production machine, with the result that there would be the risk of damage to the beverage production machine or a hazard to the user, for example by bursting of the cartridge (when the latter is intended for operation at lower pressures).

The product identifier is preferably printed or stuck on the wall of the cartridge or on the sealing element (in particular the sealing foil) for sealing off the cartridge opening. In particular, the product identifier is positioned on the cartridge such that the product identifier is arranged within the range of detection of the identifier detector of the beverage preparation machine when the cartridge has been inserted into the beverage preparation machine. Alternatively, it would also be conceivable for the product identifier not to be arranged on the cartridge but in an appropriate manner on an outer wall of the cartridge receptacle.

A further subject of the present invention is a cartridge system for producing a beverage, wherein the cartridge system is insertable into the beverage preparation machine, wherein the cartridge system has the cartridge, which comprises the reservoir filled with the beverage substance, and the cartridge receptacle, connected to the cartridge, according to the invention.

A further subject of the present invention for achieving the object stated at the beginning is a beverage preparation machine into which the cartridge system according to the invention is insertable, wherein the beverage preparation machine has a retaining unit into which the cartridge receptacle connected to the cartridge is insertable, a fluid source for injecting the fluid into the fluid feed, and a compressed-air source for blowing compressed air into the compressed-air connection. Preferably, the beverage preparation machine has the release element for transferring the piercing spike from the retracted position into the extended position.

Preferably, the release element is configured in a fixed manner such that, as a result of a movement of the capsule receptacle relative to the release element, the piercing spike is transferred from the retracted position into the extended position. To this end, the retaining unit comprises in particular a fastening flange which engages around the cartridge receptacle during or after insertion into the retaining unit, and wherein the fastening flange is coupled to a release mechanism that is operated manually or by a motor and is intended to shift the fastening flange such that a relative movement between the capsule receptacle and the release element in contact with the piercing spike is generated, with the result that the piercing spike is transferred from the retracted position into the extended position. The cartridge receptacle is thus moved against the fixed release element by the fastening flange, such that the fixed release element is pushed against the piercing spike and shifts the latter from the retracted position into the extended position. As a result, the sealing foil is perforated and the beverage production process starts.

Preferably, the beverage preparation machine has the evaluation and control unit, which is coupled to the identifier detector and is intended to determine the product identifier by analyzing the detected QR code. Preferably, the evaluation electronics determine from the QR code the GS1 code, which allows unambiguous identification of the cartridge arranged in the beverage preparation machine. The beverage preparation machine furthermore preferably has a comparison unit which is intended to compare the determined product identifier with a list of prestored product identifiers and selects a beverage production program on the basis of the comparison. Alternatively, it is conceivable for the beverage preparation machine to have an algorithm identification means which uses an algorithm to identify whether the detected QR code belongs to the system (i.e. is known) or is system-incompatible. The algorithm in this case functions in accordance with the known cryptographic encryption/decryption methods.

A further subject of the present invention for achieving the object stated at the beginning is a method for producing a beverage with the cartridge system according to the invention, having the following steps:
  inserting the cartridge system into a retaining unit of a beverage preparation machine,
  establishing a fluidic connection between a fluid source of the beverage preparation machine and the fluid feed of the cartridge receptacle,
  establishing a compressed-air connection between a compressed-air source of the beverage preparation machine and the compressed-air connection of the cartridge receptacle,
  perforating the sealing element by transferring the piercing spike from the retracted position into the extended position,
  transferring the beverage substance from the reservoir into the mixing chamber by injecting compressed air into the reservoir,
  injecting a fluid into the mixing chamber through the fluid feed, and
  discharging the beverage created in the mixing chamber by blending the beverage substance with the fluid, by means of a beverage outlet.

The abovementioned method steps should not be considered to be a required temporal sequence, but can also take place at the same time or in a different order. Preferably, for example, the actuation of the cartridge emptying device and the injection of the fluid are carried out in parallel.

Preferably, before being injected into the mixing chamber, the fluid is cooled and/or carbonated, such that cold beverages and carbonated soft drinks are producible.

According to a preferred further embodiment of the present invention, provision is made, before, during or after the insertion of the cartridge system into the retaining unit, for a piercing spike of the cartridge receptacle to be transferred from a retracted position into an extended position and thus for a sealing element at the cartridge opening to be perforated by the piercing spike. Advantageously, the reservoir is thus opened automatically, such that the beverage substance can be transferred into the mixing chamber. Preferably, during the opening operation, compressed air and fluid are already introduced into the cartridge receptacle, such that back-contamination of the beverage preparation machine by beverage substance is prevented.

Preferably, the piercing spike is transferred from the retracted position into the extended position by a release element of the beverage preparation machine, wherein the cartridge receptacle is preferably moved against the fixed release element such that the piercing spike is transferred from the retracted position into the extended position.

According to one preferred embodiment of the present invention, provision is made for the cartridge receptacle to be engaged around by a fastening flange of the retaining unit during or after the insertion of the cartridge system into the retaining unit, and wherein the fastening flange is operated and in particular shifted by a release mechanism operated manually or by a motor such that a relative movement between the capsule receptacle and the release element in contact with the piercing spike is generated, with the result that the piercing spike is transferred from the retracted position into the extended position.

Further details, features and advantages of the invention are apparent from the drawings, and from the following description of preferred embodiments with reference to the drawings. The drawings illustrate merely exemplary embodiments of the invention which do not limit the essential concept of the invention.

BRIEF DESCRIPTION OF THE DRAWINGS

FIGS. 5a to 6b show detail views of the piercing spike of the cartridge receptacle according to one exemplary embodiment of the present invention.

EMBODIMENTS OF THE INVENTION

In the various figures, identical parts are always provided with the same reference signs and are therefore each generally also mentioned only once.

Figure 1:
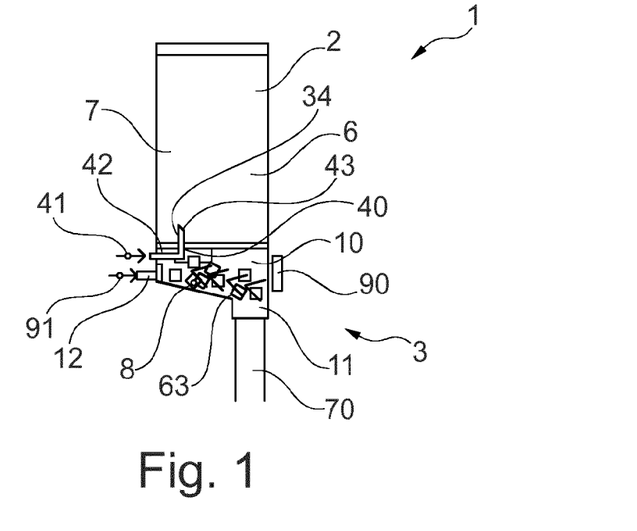
FIG. 1 shows the basic principle of the method for producing a beverage with a cartridge receptacle and a cartridge system inserted into a beverage preparation machine according to one exemplary embodiment of the present invention.

FIG. 1 shows a schematic cross-sectional view of a cartridge system 1 according to the invention, which has been inserted into a beverage preparation machine 3 and by means of which a beverage 70 is prepared, in order to illustrate the general operating principle.

The present system comprises the beverage preparation machine 3 (illustrated only schematically), into which exchangeable cartridge systems 1 are insertable. Each cartridge system 2 has a cartridge 2, which is filled with a particular beverage substance 7, and a cartridge receptacle 10 connected to the cartridge 2. Within the beverage preparation machine 3, a corresponding beverage 70 is created with the aid of the beverage substance 7 and an additional water source, referred to as fluid source 41 in the following text. The cartridge 2 is in this case preferably filled with a pre-portioned quantity of beverage substance 7 which is necessary for creating a specific drinking portion, for example a drinking glass filling of the desired beverage 70. In particular a plurality of different cartridge systems 1 are available, the cartridges 2 or reservoirs 6 of which are filled with different beverage substances 7 for producing different beverages 70. When the user of the system 1 wishes to drink a particular beverage 70, all he needs to do is choose, from the plurality of different cartridge systems 1, that cartridge system 1 which contains the corresponding beverage substance 7 for producing the desired beverage 70, insert it into a retaining unit 90 of the beverage preparation machine 3 and if appropriate start the beverage production process at the beverage preparation machine 3, for example by pressing a start button, by touching a touch sensitive display in an appropriate manner, by gesture or voice control, or by means of a suitable application on a cell phone. It is also conceivable for the beverage production process to start automatically when the insertion of a new cartridge system 1 into the retaining unit 90 is detected. In each of the abovementioned cases, the desired beverage 70 is then produced automatically, conveyed into a drinking vessel and thus provided to the user. Subsequently, the used-up cartridge system 1 is removed and disposed of. The beverage preparation machine 3 is now ready once again to be filled with any desired new cartridge system 1 in order to produce a further beverage 70.

The beverage substance 7 comprises preferably liquid premixing constituents for soft drinks, such as caffeinated, carbonated, fruity and/or sugary sodas and juices, beer (mixed) drinks, or other alcoholic or nonalcoholic (mixed) drinks.

The cartridge system 1 comprises a cartridge 2 in the form of a cylindrical container with rounded corners. The container is hollow and thus contains a reservoir 6 for the beverage substance 7. A typical cartridge 2 is illustrated in detail in FIGS. 2*a*, 7*a*, 7*b* and 7*c*. The cartridge 2 is produced in particular from plastic and by an injection blow-molding process. The cartridge 2 also has a cartridge opening 63 through which the reservoir 6 is filled with the liquid beverage substance 7. The bottom of the reservoir 6 is configured in a funnel-shaped manner in the example in FIG. 2*a*, wherein the cartridge opening 63 is arranged in the center of the funnel-shaped bottom. The cartridge 2 is connected fixedly or reversibly to a cartridge receptacle 10 according to the invention. The cartridge receptacle 10 is in particular connected to the cartridge 2 by means of a latching connection 50 in the region of the cartridge opening 63 after the filling of the cartridge 2. To this end, the cartridge receptacle 10 has for example lateral latching elements 51 in the form of elastic retaining arms or a circumferential latching strip 51 (FIGS. 8*a* to 8*c*) which engages around one (FIG. 2*a*) or two (FIGS. 7*a* to 7*c*) circumferential retaining flanges 52 of the cartridge 2 that are arranged in the region of the cartridge opening 63. The cartridge receptacle 10 is clip-fastened onto the cartridge 2 after the filling of the cartridge 2. The precise configuration of the cartridge receptacle 10 is illustrated in detail in FIGS. 8*a*, 8*b* and 8*c*.

The cartridge receptacle 10 has a mixing chamber 8 which is fluidically connected to the reservoir 6 during the beverage production process, such that, with the aid of a cartridge emptying device 34 of the cartridge receptacle 10, the beverage substance 7 can be transferred at least partially out of the reservoir 6 into the mixing chamber 8. The cartridge emptying device 34 to this end comprises a compressed-air line 40. One end of the compressed-air line 40 is connected to a compressed-air connection 42 which can be connected to a compressed-air source 41 of the beverage preparation machine 3 in order to introduce compressed air into the compressed-air line 40, while the other end leads into a compressed-air outlet 43 which is open in the direction of the reservoir 6 and introduces compressed air into the reservoir 6. The introduction of the compressed air causes the beverage substance 7 to be pushed into the mixing chamber 8.

A fluid feed 12 of the cartridge receptacle 10, which is supplied by a fluid source 91 of the beverage preparation machine 3, also leads into the mixing chamber 8. It is conceivable for the fluid feed 12 to have a quick coupling, by way of which the fluid feed 12 can be connected to the fluid source 91 of the beverage preparation machine 3. The quick coupling can be configured for example such that, when the cartridge system 1 is inserted into the retaining unit 90, a fluidic connection is automatically established between the fluid source 91 and the mixing chamber 8 via the fluid feed 12. During the beverage production process, fluid, in particular cooled and carbonated drinking water, passes from the fluid feed 12 into the mixing chamber 8 via this fluidic connection. Furthermore, during the beverage production process, beverage substance 7 passes from the reservoir 6 into the mixing chamber 8, as described above. As a result of the beverage substance 7 being blended with the fluid in the mixing chamber 8, the beverage 70 is formed, which then leaves the mixing chamber 8 through a beverage outlet 11.

The cartridge receptacle 10 has the beverage outlet 11, through which the beverage 70 produced within the mixing chamber 8 leaves the mixing chamber 8, and is conveyed in particular directly into the drinking vessel (not depicted), i.e. without parts of the beverage preparation machine 3 coming into contact with the beverage 70. In this way, back-contamination of the beverage preparation machine 3 is prevented. The drinking vessel is arranged in particular directly beneath the beverage outlet 11.

Following completion of the beverage production process, the cartridge system 1 is removed from the retaining unit 90, such that the beverage production machine 3 can be fitted with a new and unused cartridge system 1. The cartridge receptacle 10 can be reused by being separated from the used cartridge 2 by releasing the latching connection 50, and being clip-fastened onto a new cartridge 2.

Figure 2A:
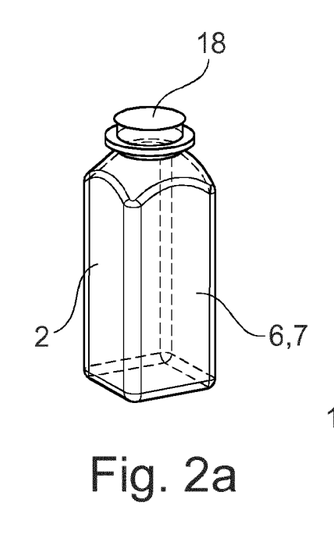
FIGS. 2a to 2c show schematic views of a cartridge, of a cartridge receptacle and of a cartridge system according to one exemplary embodiment of the present invention.
Figure 2B:
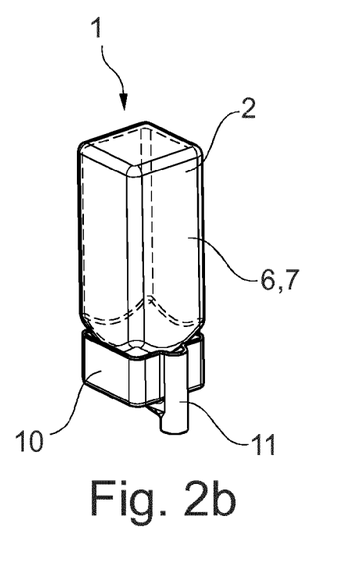
Figure 2C:
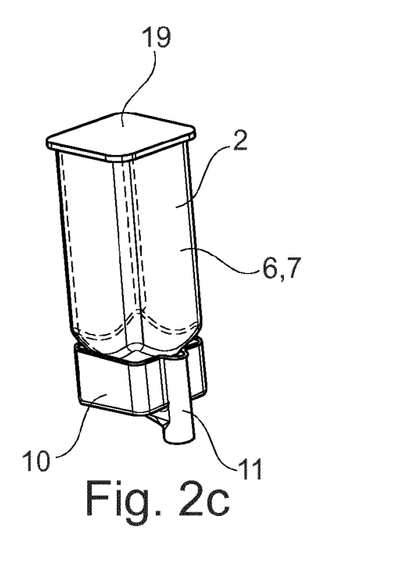

FIGS. 2a to 2c illustrate schematic views of a cartridge 2, of a cartridge receptacle 10 and of a cartridge system 1 according to one exemplary embodiment of the present invention.

The cartridge receptacle 10 has been clip-fastened onto the cartridge 2 in the above-described manner, and has the mixing chamber 8, the beverage outlet 11, the cartridge emptying device 34, and the fluid feed 12. In order that the cartridge 2 is closed in an aroma-tight manner during the storage and transport of the cartridge system 1, in the present embodiment, the cartridge opening 63 is closed with a sealing element 18 in the form of a thin sealing foil. Following the production of the cartridge 2 in the injection blow-molding process, the sealing foil is adhesively bonded or sealed onto the edge of the cartridge opening 63 (see FIG. 2a). Only then is the cartridge receptacle 10 clip-fastened onto the cartridge 2 (see FIG. 2b).

FIG. 2c shows an alternative in which the cartridge 2 has not been produced in an injection blow-molding process but in an injection-molding process. The cartridge 2 in this case has a further cartridge opening which is closed by a further sealing foil 19 in that the further sealing foil 19 is sealed onto the edge of the further cartridge opening in an analogous manner. Since two sealing steps are necessary in this case, this alternative is less preferred, however. FIGS. 3a to 4a are therefore based on the cartridge 2 shown in FIGS. 2a and 2b again.

Figure 3A:
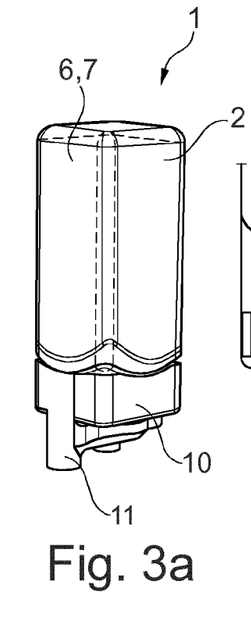
FIGS. 3a to 3c show schematic views of a cartridge receptacle and of a cartridge system according to one exemplary embodiment of the present invention.
Figures 3B, 3C:
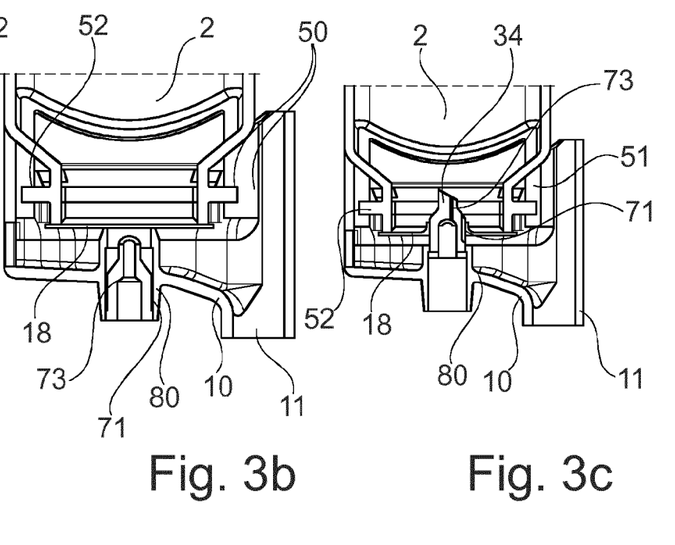

FIGS. 3a to 3c illustrate schematic views of a cartridge receptacle 10 and of a cartridge system 1 according to one exemplary embodiment of the present invention.

The cartridge receptacle 10 has a spike guide 80 in which a piercing spike 73 is mounted in a displaceable manner. The sealing element 18 is perforated by the displaceable piercing spike 73 being transferred between a retracted position, in which the piercing spike 73 is away from the sealing element 18 (cf. FIG. 3b), and an extended position, in which the piercing spike 73 pierces the sealing element 18 (cf. FIG. 3c) and projects into the cartridge opening 63 or into the reservoir 6.

The outer wall of the piercing spike 73 is provided with the plurality of lateral channels 71 for conveying the beverage substance 7 from the reservoir 6 in the direction of the mixing chamber 8 when the sealing element 18 is pierced. The lateral channels 71 are configured in the form of grooves that are open on one side and extend parallel to one another. Following the piercing of the sealing element 18, the lateral channels 71 become fluidically connected to the reservoir 6, such that the beverage substance 7 can flow around the edges of the pierced sealing element 18 in the direction of the mixing chamber 8.

The cross section of the lateral channels 71 and/or the number of the lateral channels 71 is in this case preferably adapted to the viscosity of the beverage substance 7, such that the lateral channels 71 control or limit the flow of the beverage substance 7 in the direction of the mixing chamber 8. At a high viscosity, a plurality of lateral channels 71 and/or lateral channels 71 with a relatively large cross section are used, while, at a lower viscosity, fewer lateral channels 71 and/or lateral channels 71 with a smaller cross section are provided.

Also integrated into the piercing spike 73 is the compressed-air line 40, which acts as the cartridge emptying device 34. The compressed-air line 40 leads into the cartridge opening 63 through a fixed compressed-air tip 72 at the end of the piercing spike 73 when the piercing spike 73 is in the extended position. The compressed-air tip 72 thus projects automatically into the cartridge opening 63 when the piercing spike 73 has been shifted into the extended position and has consequently pierced the sealing element 18.

On a side of the piercing spike 73 that is in particular remote from the reservoir 6, the compressed-air connection 42 is formed, which is thus accessible from outside the cartridge receptacle 10 and is connectable to the compressed-air source 41 of the beverage preparation machine 3. Preferably, the piercing spike 73 is transferred from the retracted position into the extended position during or after the insertion of the cartridge system 10 into the beverage preparation machine 3 or after the starting of the beverage production process, preferably by a fixed release element of the retaining unit 90, against which the piercing spike 73 is pushed.

Provision is preferably made for both the fluid source 91 and the compressed-air source 41 to be coupled directly to the fluid feed 12 and to the compressed-air connection 42, respectively, as soon as the cartridge system 1 is inserted into the beverage preparation machine 3 or a beverage production process is started, and in particular before the sealing element 18 is pierced. In this way, back-contamination in the direction of the beverage preparation machine 3 is effectively avoided because the fluid feed 12 and the cartridge emptying device 34 are immediately under overpressure upon insertion of the cartridge system 1, and this prevents the beverage substance 7 from traveling in the direction of the fluid source 91 and compressed-air source 41, respectively. The beverage substance 7 can thus move only in the direction of the mixing chamber 8 from the reservoir 6 as soon as the sealing element 18 is opened.

Figure 4A:
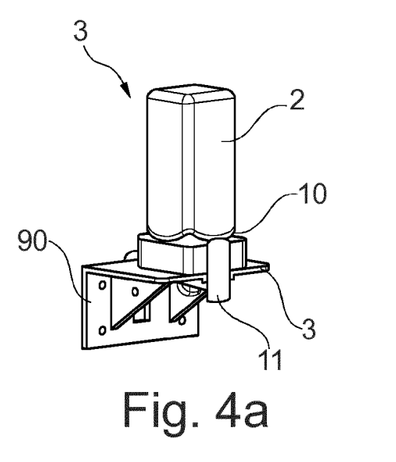
FIGS. 4a and 4b show schematic views of a cartridge receptacle and of a cartridge system inserted into a retaining unit of a beverage preparation machine according to one exemplary embodiment of the present invention.
Figure 4B:
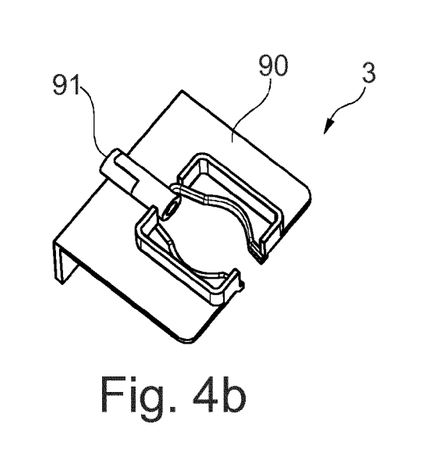
Figure 5A:
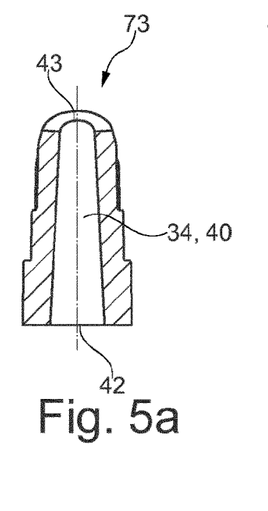
Figure 5B:
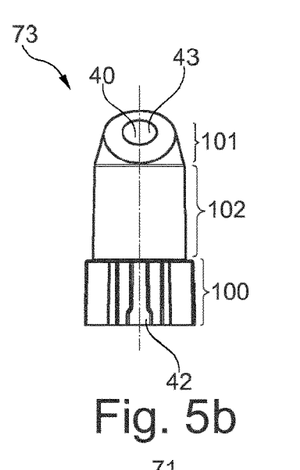
Figure 5C:
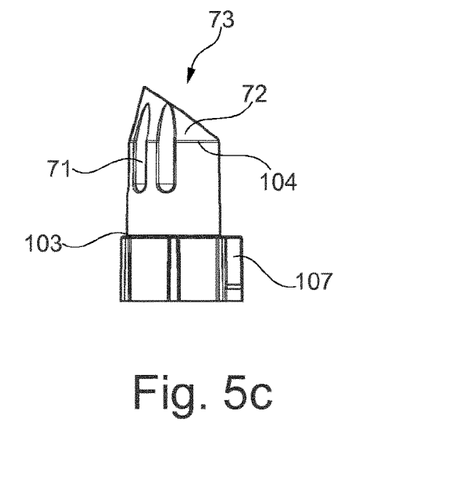
Figure 5D:
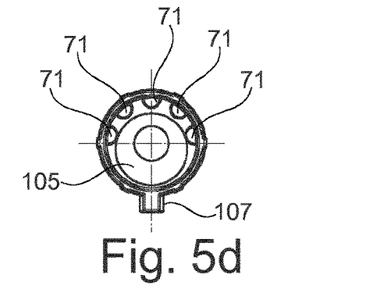
Figure 6A:
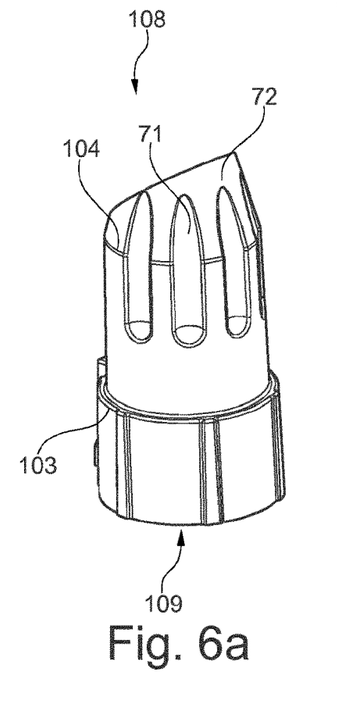
Figure 6B:
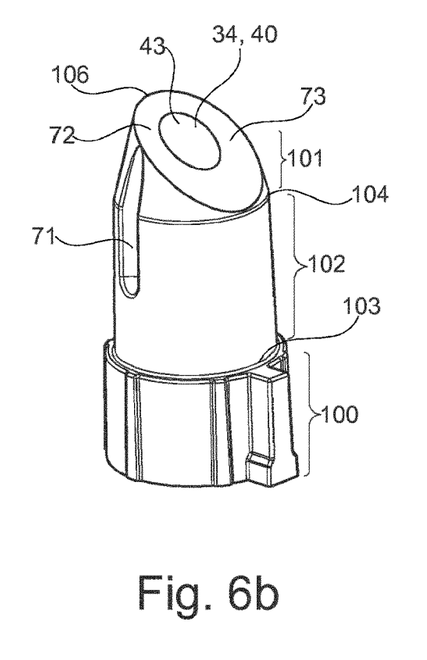

FIG. 4a illustrates a schematic view of a cartridge receptacle 10 and of a cartridge system 1 according to the exemplary embodiment of the present invention, inserted into a retaining unit 90 of a beverage preparation machine 3. FIG. 4b shows a detail view of the retaining unit 90, which consists substantially of a receptacle for the cartridge receptacle 10, and comprises a line, running to the fluid source 91 of the beverage preparation machine 3, for connecting to the fluid feed of the cartridge system 1.

The retaining unit 90 has in particular a fastening flange (not illustrated) which engages around the cartridge receptacle 10 in a form-fitting manner after it has been inserted into the retaining unit 90. The retaining unit 90 is preferably manually operable, for example via an operating lever. When a user actuates the operating lever, the cartridge receptacle 10 is moved relative to the beverage preparation machine 3 such that the outer end of the piercing spike 73 is pushed against a fixed release element (not illustrated) of the retaining unit 90, with the result that the piercing spike 73 moves from the retracted position into the extended position and perforates the sealing element.

FIGS. 5a, 5b, 5c, 5d, 6a and 6b show detail views of the piercing spike 73 of the cartridge receptacle 10 according to one exemplary embodiment of the present invention.

Integrated into the piercing spike 73 is the compressed-air line 40 that extends along the piercing spike 73. The compressed-air line 40 extends from a first end 109 of the piercing spike 73 to a second end 108 of the piercing spike 73.

The piercing spike 73 is constructed substantially integrally from three parts: A cylindrical base part 100, a piercing part 101, extending in the direction of the reservoir 6, in the form of an obliquely truncated cone, and an intermediate part 102 which is arranged between the base part 100 and the piercing part 101 and is configured in a frustoconical manner. Formed between the base part 100 and the intermediate part 102 is a circumferential shoulder 103, while a circumferential edge 104 is formed between the piercing part 101 and the intermediate part 102.

As a result of the piercing part 101 being configured as an obliquely truncated cone, the piercing part 101 has an oblique cut face 105 with an oval circumference 106, which acts partially as a cutting edge for perforating the sealing element 18. That part of the cutting edge which protrudes furthest in the direction of the reservoir 6 severs the sealing element 18 upon perforating the latter with a smooth cut. As a result of the oblique cut face 105, that part of the sealing element 18 that is partially separated from the sealing element 18 is not completely separated from the rest of the sealing element 18, however, but rather the partially separated part of the sealing element 18 rolls or folds together partially via the cut face 105. This prevents separated parts of the sealing element from passing into the mixing chamber 8.

Formed on that side of the piercing element 73 that is on the opposite side from the cut face 105 are the lateral channels 71. This has the advantage that the lateral channels 71 are arranged in the sealing element 18 in the region of the smooth cut, with the result that the beverage substance 7 can pass into the lateral channels 71 in an unimpeded manner. Preferably, exactly five lateral channels 71 that extend virtually parallel to one another are provided. The lateral channels 71 each extend from the piercing part 101, via the circumferential edge 104, into the intermediate part 102, with the result that the beverage substance 7 can pass into the lateral channels 71 better.

The compressed-air outlet 43 is located within the cut face 105, while the compressed-air inlet or connection 42 is formed in the base part 100.

Also provided on the base part 100 is a twist prevention means in the form of a rib 107 protruding radially from the base part 100. The spike guide 80 has, within the wall of the guide channel 110, a groove corresponding to the rib 107, such that the piercing spike 73 is mounted such that it cannot twist with respect to the spike guide 80.

The piercing spike 71 is preferably configured as a plastic part and particularly preferably as an injection-molded plastic part.

Figures 7A, 7B:
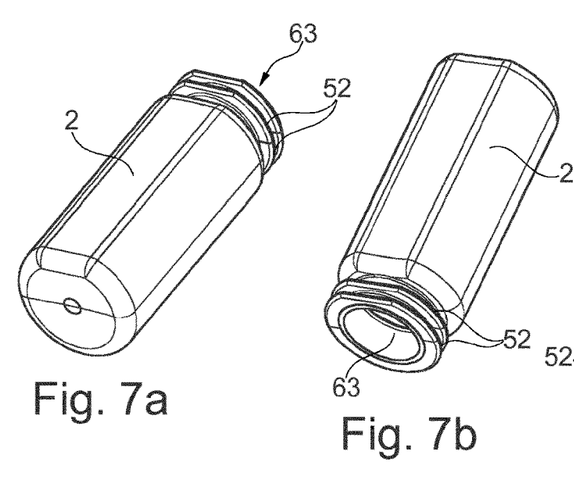
FIGS. 7a to 7c show schematic views of the cartridge of the cartridge system according to one exemplary embodiment of the present invention.
Figure 7C:
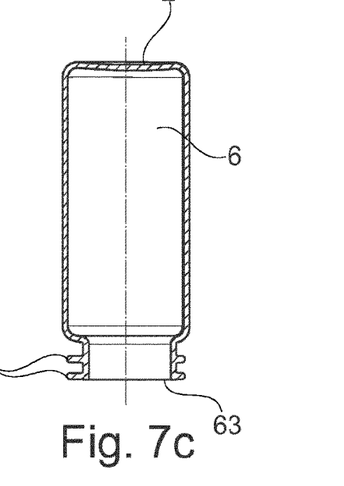

FIGS. 7a, 7b and 7c show schematic views of the cartridge 2 of the cartridge system 1 according to one exemplary embodiment. It is apparent that the cartridge 2 comprises a bottle-like object with rounded corners, flattened longitudinal sides and a cartridge opening 63. In the region of the cartridge opening 63, the cartridge 2 has two circumferential retaining flanges 52 onto which the cartridge receptacle 10 is clip-fastened.

Figure 8A:
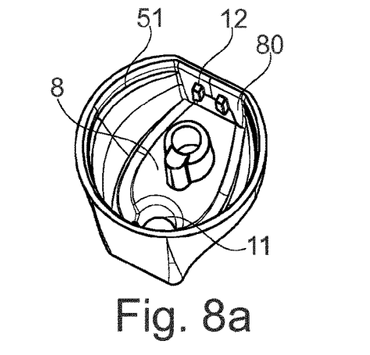
FIGS. 8*a* to 8*c* show schematic views of a cartridge receptacle of the exemplary embodiment of the present invention.
Figure 8B:
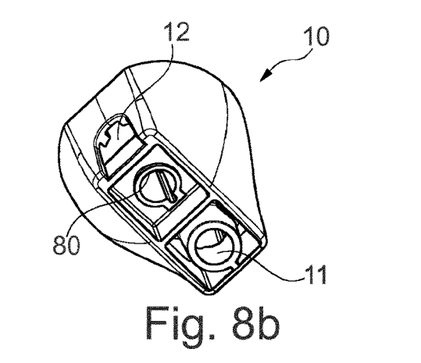
Figure 8C:
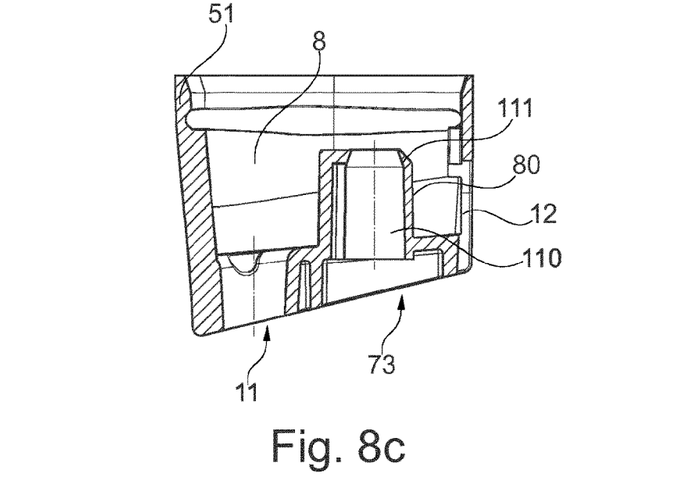

FIGS. 8a, 8b and 8c show schematic views of a cartridge receptacle 10 of the exemplary embodiment of the present invention. The cartridge receptacle 10 has, on both sides, an at least partially circumferential latching strip 51 by way of which the cartridge receptacle 10 is clip-fastened onto the retaining flanges 52 of the cartridge 2. Furthermore, the cartridge receptacle 10 has a mixing chamber 8, on the rear side of which the fluid feed 12 is formed in the form of a simple passage opening in the wall of the cartridge receptacle 10. On the front side, the beverage outlet 11 is formed in the bottom of the mixing chamber 8. The bottom of the mixing chamber 8 forms, in the direction of the beverage outlet 11, a continuously deepening recess such that, following completion of the beverage production process, no liquid residues remain in the mixing chamber 8. Moreover, the spike guide 80 can be seen virtually centrally within the mixing chamber 8 in FIGS. 8a to 8c.

The spike guide 80 comprises a guide part with an internal guide channel 110 in which the piercing spike 73 is accommodated in a displaceable manner. The guide channel 110 is formed in a substantially cylindrical manner and protrudes virtually perpendicularly from the bottom of the mixing chamber 8 in the direction of the cartridge 2. Formed at an end of the guide part that faces the cartridge 2 is a circumferential stop 111 with a reduced diameter, against which the circumferential shoulder 103 of the piercing spike 73 butts when the piercing spike 73 arrives in the extended position. The stop thus limits the movement of the piercing spike 73 in the direction of the reservoir 6. Optionally, mixing structures are arranged on the bottom of the mixing chamber 8.

By way of the above-described twist prevention means in the form of the rib 107, which engages in the corresponding groove in the spike guide 80, twisting of the piercing spike 73 as it is being transferred from the retracted position into the extended position is prevented. This thus ensures in addition that the lateral channels 71 are always arranged on that half-side of the piercing spike 73 which faces away from the beverage outlet 11 of the mixing chamber 8 and faces the fluid feed 12. In this way, improved mixing of the beverage substance 7 and the fluid within the mixing chamber 8 is achieved.

For reasons of clarity, the piercing spike 73 is not illustrated in FIGS. 8a to 8c.

LIST OF REFERENCE SIGNS

1 Cartridge system
2 Cartridge
3 Beverage preparation machine
6 Reservoir
7 Beverage substance
8 Mixing chamber
10 Cartridge receptacle
11 Beverage outlet
12 Fluid feed
18 Sealing element
19 Further sealing element
34 Cartridge emptying device
40 Compressed-air line
41 Compressed-air source
42 Compressed-air connection
43 Compressed-air outlet
50 Latching connection
51 Latching elements/latching strip
52 Retaining flange
63 Cartridge opening
71 Lateral channel
70 Beverage
73 Piercing spike
80 Spike guide
90 Retaining unit
91 Fluid source
100 Base part
101 Piercing part
102 Intermediate part
103 Shoulder
104 Edge
105 Cut face
106 Circumference
107 Rib
108 First end
109 Second end 110 Guide channel
111 Stop

The invention claimed is:
1. A cartridge system for producing a beverage in a beverage preparation machine, the cartridge system comprises:
   A) a cartridge comprising:
      i) a reservoir containing a beverage substance, the reservoir having a cartridge opening; and
      ii) a sealing element that closes the cartridge opening of the reservoir;
   B) a cartridge receptacle that is fastened around the closed cartridge opening of the cartridge, the cartridge receptacle comprising:
      i) mixing chamber;
      ii) a fluid feed that connects the mixing chamber to a fluid source of the beverage preparation machine; and
      iii) a spike guide and a piercing spike mounted in a displaceable manner within the spike guide, the piercing spike is displaceable between a retracted position, in which the piercing spike is spaced away from the sealing element of the cartridge, and an extended position, in which the piercing spike pierces the sealing element of the cartridge and projects into the reservoir, wherein an outer wall of the piercing spike has at least one lateral channel for conveying the beverage substance out of the reservoir of the cartridge and in a direction of the mixing chamber of the cartridge receptacle when the sealing element is pierced, wherein after the sealing element is pierced by the piercing spike, the beverage substance is conveyed out of the reservoir of the cartridge and directed into the mixing chamber of the cartridge receptacle, and the beverage substance is mixed in the mixing chamber with a fluid from the fluid source of the beverage production machine that is supplied into the mixing chamber through the fluid feed to produce the beverage; and
      iv) a beverage outlet, through which the beverage produced in the mixing chamber leaves the mixing chamber;
   wherein the cartridge receptacle is fastened around the closed cartridge opening of the cartridge before the cartridge receptacle and the cartridge are inserted into the beverage preparation machine.

2. The cartridge system as claimed in claim 1, wherein the piercing spike comprises a cylindrical or frustoconical base part and a piercing part that extends in a direction of the reservoir, wherein the piercing part comprises an obliquely truncated cone.

3. The cartridge system as claimed in claim 2, wherein the piercing spike comprises an intermediate part arranged between the base part and the piercing part, the intermediate part being configured in a frustoconical manner, wherein a circumferential shoulder is formed between the base part and the intermediate part, and wherein a circumferential edge is formed between the piercing part and the intermediate part.

4. The cartridge system as claimed in claim 3, wherein the piercing part comprises an oblique cut face that faces the sealing element, wherein an oval circumference of the oblique cut face comprises a cutting edge for perforating the sealing element.

5. The cartridge system as claimed in claim 4, wherein the cartridge receptacle has one or a plurality of lateral channels, wherein the one or each of the plurality of lateral channels extend parallel to the piercing spike in a region of the piercing part and in a region of the intermediate part.

6. The cartridge system as claimed in claim 5, wherein the one or each of the plurality of lateral channels are each configured in the form of a groove, open on one side, introduced into an outer face of the piercing spike.

7. The cartridge system as claimed in claim 5, wherein the one or each of the plurality of lateral channels are formed at least partially in a rear circumferential region, with respect to the oblique cut face, of the piercing spike.

8. The cartridge system as claimed in claim 5, wherein the one or each of the plurality of lateral channels are formed on a side of the piercing spike that faces away from the beverage outlet of the mixing chamber.

9. The cartridge system as claimed in claim 1, wherein the piercing spike has a twist prevention means in a form of a rib protruding radially from a base part.

10. The cartridge system as claimed in claim 1, wherein the piercing spike has a compressed-air line, which is a cartridge emptying device for introducing compressed air into reservoir of the cartridge to push the beverage substance from the reservoir into the mixing chamber of the cartridge receptacle, wherein the compressed-air line extends along the piercing spike from a first end of the piercing spike to a second end of the piercing spike.

11. The cartridge system as claimed in claim 10, wherein the piercing spike has a compressed-air connection at the second end for connecting to a compressed-air source for supping the compressed air, and the piercing spike has a compressed-air outlet at the first end for introducing the compressed air into the reservoir.

12. The cartridge system as claimed in claim 11, wherein the compressed-air outlet is configured as an opening in a cut face of the piercing spike.

13. The cartridge system as claimed in claim 11, wherein the compressed-air connection is configured as an opening in a base part of the piercing spike, and wherein the base part is arranged in the cartridge receptacle such that the compressed-air connection is accessible from outside the cartridge receptacle.

14. The cartridge system as claimed in claim 1, wherein the spike guide has a guide part with an internal guide channel for receiving the piercing spike, wherein the guide channel of the guide part is configured in a cylindrical or frustoconical manner, and wherein a circumferential stop is formed at an end of the guide part that faces the cartridge, the circumferential stop limiting the movement of the piercing spike in a direction of the reservoir, wherein the circumferential stop comprises a region with a reduced diameter relative to the guide channel.

15. The cartridge system as claimed in claim 14, wherein a groove corresponding to a rib is formed as twist prevention means within a wall of the guide channel.

16. The cartridge system as claimed in claim 14, wherein the guide part is arranged in the mixing chamber and protrudes from a bottom of the mixing chamber in a direction of the cartridge.

17. The cartridge system as claimed in claim 1, wherein the piercing spike is transferred from the retracted position into the extended position when the cartridge system is inserted into the beverage preparation machine.

18. The cartridge system as claimed in claim 1, wherein the cartridge receptacle is releasably connectable to the end of the cartridge via a latching connection.

19. The beverage preparation machine for producing the beverage, into which the cartridge system as claimed in claim 1 is insertable, wherein the beverage preparation machine comprises:

i) a retaining unit configured to receive the cartridge system,
ii) the fluid source for supplying the fluid into the fluid feed of the cartridge receptacle, and
iii) a compressed-air source for blowing compressed air into a compressed-air connection of the piercing spike to push the beverage substance from the reservoir into the mixing chamber of the cartridge receptacle.

20. The beverage preparation machine as claimed in claim 19, wherein as a result of a movement of the capsule receptacle relative to the retaining unit, the piercing spike is transferred from the retracted position into the extended position.

21. The beverage preparation machine as claimed in claim 20, wherein the retaining unit comprises a fastening flange which engages around the cartridge receptacle during or after insertion of the cartridge system into the retaining unit, and wherein during the movement of the capsule receptacle relative to the retaining unit, the piercing spike is transferred from the retracted position into the extended position.

22. The beverage preparation machine as claimed in claim 19, wherein the mixing chamber of the cartridge receptacle is arranged below the reservoir of the cartridge after the cartridge receptacle and the cartridge are inserted into the beverage preparation machine.

23. The cartridge system according to claim 1, wherein the beverage substance and the fluid from the beverage preparation machine are mixed in a region of the cartridge system that is outside of the cartridge.

24. The cartridge system according to claim 1, wherein the cartridge comprises one or more retaining flanges and the cartridge receptacle has one or more latching elements that engage around the one or more retaining flanges of the cartridge.

25. The cartridge system according to claim 24, wherein the one or more latching elements comprise one or more retaining arms or a circumferential latching strip, and/or wherein the one or more retaining flanges of the cartridge are arranged in a region of the cartridge opening.

26. The cartridge system as claimed in claim 1, wherein the cartridge receptacle comprises one or more lateral channels.

27. The cartridge system as claimed in claim 1, wherein the piercing spike has a compressed-air line, for introducing compressed air into reservoir of the cartridge.

28. The cartridge system as claimed in claim 1, wherein the at least one lateral channel extends only partially along a length of the piercing spike.

29. The cartridge system as claimed in claim 1, wherein the piercing part comprises an oblique cut face that faces the sealing element.

30. The cartridge system as claimed in claim 1, wherein the cartridge receptacle comprises a recessed region into which the closed cartridge opening is received.

* * * * *